United States Patent
Suzuki et al.

(10) Patent No.: US 9,736,415 B2
(45) Date of Patent: Aug. 15, 2017

(54) ELECTRIC DEVICE, REMOTE CONTROL SIGNAL DETERMINING PROGRAM AND REMOTE CONTROL SIGNAL PROCESSING METHOD

(71) Applicant: Yamaha Corporation, Hamamatsu-shi, Shizuoka (JP)

(72) Inventors: Koji Suzuki, Iwata (JP); Takeshi Oishi, Hamamatsu (JP); Masataka Ogawa, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/424,550

(22) PCT Filed: Aug. 16, 2013

(86) PCT No.: PCT/JP2013/072026
§ 371 (c)(1),
(2) Date: Feb. 27, 2015

(87) PCT Pub. No.: WO2014/034446
PCT Pub. Date: Mar. 6, 2014

(65) Prior Publication Data
US 2015/0229865 A1 Aug. 13, 2015

(30) Foreign Application Priority Data
Aug. 30, 2012 (JP) .................. 2012-190486

(51) Int. Cl.
*H04N 5/44* (2011.01)
*G08C 17/02* (2006.01)
(Continued)

(52) U.S. Cl.
CPC ........... *H04N 5/4403* (2013.01); *G08C 17/02* (2013.01); *G08C 19/28* (2013.01);
(Continued)

(58) Field of Classification Search
CPC ... H04N 2005/4426; H04N 2005/4435; H04N 5/4403
(Continued)

(56) References Cited

U.S. PATENT DOCUMENTS

| 5,313,199 A | 5/1994 | Kwon |
| 5,483,231 A | 1/1996 | Sasabe |

(Continued)

FOREIGN PATENT DOCUMENTS

| JP | 2-192297 A | 7/1990 |
| JP | 5-328452 A | 12/1993 |

(Continued)

OTHER PUBLICATIONS

International Search Report (PCT/ISA/210) dated Oct. 15, 2013, with English translation (Three (3) pages).
(Continued)

*Primary Examiner* — Paulos M Natnael
*Assistant Examiner* — Jean W Desir
(74) *Attorney, Agent, or Firm* — Crowell & Moring LLP (57) ABSTRACT

When a received remote control signal does not satisfy any one of a plurality of conditions for a qualified remote control signal stored in a signal condition storage part, an electric device determines that the remote control signal is not a qualified remote control signal, and when the received remote control signal satisfies any one of the conditions, stores the remote control signal as a qualified remote control signal in a signal storage part. Next, when the received remote control signal matches the qualified remote control signal stored in the signal storage part, control is performed such that the electric device performs a predetermined operation. The conditions for the qualified remote control signal include, for example, that a pulse count is within a range of a predetermined number, and that a pulse width is within a range of a predetermined length.

6 Claims, 5 Drawing Sheets

(51) Int. Cl.
*G08C 19/28* (2006.01)
*H04N 21/422* (2011.01)

(52) U.S. Cl.
CPC ... *H04N 21/42221* (2013.01); *G08C 2201/20* (2013.01); *G08C 2201/40* (2013.01); *H04N 2005/4426* (2013.01); *H04N 2005/4435* (2013.01)

(58) Field of Classification Search
USPC .............. 348/734, 552, 14.05, 14.04, 114; 340/815.6, 426.13, 426.14; 725/80, 81
See application file for complete search history.

(56) References Cited

U.S. PATENT DOCUMENTS

| | | | | |
|---|---|---|---|---|
| 5,578,999 | A * | 11/1996 | Matsuzawa | H04B 1/202 340/12.24 |
| 6,292,230 | B1 | 9/2001 | Shui et al. | |
| 6,795,130 | B2 * | 9/2004 | Shibamiya | H04N 5/44 348/14.05 |
| 2005/0204246 | A1 | 9/2005 | Sakai | |
| 2005/0280551 | A1 * | 12/2005 | Hesdahl | G08C 23/04 340/12.19 |
| 2008/0106514 | A1 * | 5/2008 | Urashima | H03J 9/00 345/156 |
| 2010/0053468 | A1 | 3/2010 | Harvill | |

FOREIGN PATENT DOCUMENTS

| | | |
|---|---|---|
| JP | 8-65771 A | 3/1996 |
| JP | 2008-102339 A | 5/2008 |

OTHER PUBLICATIONS

European Search Report issued in counterpart European Application No. 13832270,6 dated Mar. 16, 2016 (nine pages).
European Office Action issued in counterpart European Application No. 13 832 270.6 dated Mar. 23, 2017 (8 pages).

* cited by examiner

| PROTOCOL | PULSE COUNT | PULSE WIDTH (ms) | LEADER PULSE HIGH-VOLTAGE TIME (ms) | LEADER PULSE LOW-VOLTAGE TIME (ms) |
|---|---|---|---|---|
| PROT_A | 34 | 0.56~9.0 | 9.0 | 4.5 |
| PROT_A' | 66 | 0.56~9.0 | 9.0 | 4.5 |
| PROT_B | 50 | 0.4~3.2 | 3.2 | 1.6 |
| ... | ... | ... | ... | ... |

ELECTRIC DEVICE, REMOTE CONTROL SIGNAL DETERMINING PROGRAM AND REMOTE CONTROL SIGNAL PROCESSING METHOD

TECHNICAL FIELD

The present invention relates to an electric device which performs an operation based on a stored remote control signal.

BACKGROUND ART

In the related art, a remote control signal learning device which stores a remote control signal transmitted from a remote controller, and performs a predetermined operation if the same remote control signal as the stored remote control signal is received, is known.

Since a digital optical signal which is used as a remote control signal is configured by an infrared ray, sunlight or light from a fluorescent lamp becomes noise, and erroneous learning in the remote control signal learning device may occur.

Accordingly, Patent Literature 1 describes that a leader pulse of a remote control signal is detected, a non-signal period is predicted from the leader pulse, and the remote control signal is not acquired during the period (pause period). According to the invention of Patent Literature 1, the operation prevents acquisition of a noise signal inserted during the pause period.

CITATION LIST

Patent Literature

Patent Literature 1: JP-A-5-328452

SUMMARY OF INVENTION

Technical Problem

In the remote control signal learning device of the related art, since it is necessary to learn remote control signals of various remote controllers, the received remote control signal is learned as it is while a protocol is not specified. For this reason, even if a remote control signal including noise is received, the remote control signal learning device learns the remote control signal as it is.

Accordingly, one object of the present invention is to provide an electric device which determines whether or not a received remote control signal is a qualified remote control signal.

Solution to Problem

According to an aspect of the present invention, there is provided an electric device which has a remote control signal learning function of storing a first remote control signal as a qualified remote control signal in a storage part. The electric device includes a reception part which receives the first remote control signal and a second remote control signal different from the first remote control signal, a signal condition storage part which stores a plurality of conditions for the qualified remote control signal, and a control part which performs first processing or second processing when the second remote control signal is received by the reception part. The first processing is processing for performing control such that the electric device performs a predetermined operation when the second remote control signal matches the qualified remote control signal stored previously in the storage part, and the second processing is processing for, when the second remote control signal received by the reception part does not satisfy any one of the conditions for the qualified remote control signal stored in the signal condition storage part at a time of learning the second remote control signal, determining that the second remote control signal is not a qualified remote control signal and preventing the second remote control signal from being stored in the storage part.

The conditions for the qualified remote control signal include, for example, that a pulse count is within a range of a predetermined number, and that a pulse width is within a range of a predetermined length.

An electric device which is controlled by a learning remote control device of the related art stores a protocol of a remote control signal to be received by the electric device. The electric device to be controlled determines whether or not the received remote control signal matches the protocol, thereby determining whether or not the received remote control signal is a qualified remote control signal. As a result, the electric device which is controlled by the learning remote control device of the related art does not operate erroneously even if noise or a remote control signal of a protocol different from the protocol is received.

Like the electric device according to the aspect of the present invention, an electric device to be controlled does not understand a protocol of a received remote control signal at the time of learning the remote control signal, and may thus erroneously learn a remote control signal including a noise component. As a result, the electric device to be controlled may not operate even if a correct remote control signal is received after erroneous learning or may perform an unexpected operation.

Accordingly, the electric device according to the aspect of the present invention determines whether or not the received remote control signal matches a condition for a qualified remote control signal of any one of a plurality of protocols (for example, protocols of all manufacturers), thereby determining whether or not the remote control signal is a qualified remote control signal.

For example, light emitted from a fluorescent lamp does not satisfy any condition for the qualified remote control signal. The control part collates the pulse count or the pulse width of the received infrared ray with the conditions for the qualified remote control signal, and when it is determined that no conditions match, determines that the received infrared ray is not a qualified remote control signal. If a remote control signal which matches any condition for the qualified remote control signal is received by the reception part, the control part determines that the remote control signal is a qualified remote control signal.

As described above, the electric device of the present invention determines whether or not the received remote control signal is a qualified remote control signal, whereby it is possible to prevent erroneous storage of an infrared ray from a fluorescent lamp or to prevent an erroneous operation of the electric device by the infrared ray.

In the above-described electric device, all conditions (protocols) which are used for a remote control signal may be stored. As a result, in the electric device, it is possible to prevent a signal which does not match any protocol and is noise apparently from being erroneously stored.

In the above-described electric device, the control part may specify a protocol of the second remote control signal received by the reception part.

In the above-described electric device, the control part may determine that the received second remote control signal is not the qualified remote control signal when the received remote control signal satisfies a first condition among the conditions for the qualified remote control signal, but does not satisfy a second condition corresponding to the specified protocol.

The control part specifies a protocol and can thus narrow down all conditions for the qualified remote control signal for use in determining whether or not the received remote control signal is a qualified remote control signal to only the condition for the remote control signal corresponding to the specified protocol. As a result, even if a noise signal or qualified remote control signals of other protocols are received continuously after the qualified remote control signal corresponding to the specified protocol is received, the electric device determines that these signals are not the specified qualified remote control signal, whereby it is possible to prevent a noise signal or other remote control signals from being erroneously stored.

In the above-described electric device, when it is determined that a noise component is included in the remote control signal, the control part may perform denoising processing for removing the noise component from the remote control signal and may store the remote control signal in the signal storage part or may discard the remote control signal without storing the remote control signal.

Advantageous Effects of Invention

According to the present invention, it is determined whether or not a received remote control signal is a qualified remote control signal, whereby it is possible to prevent erroneous storage of remote control signals.

DESCRIPTION OF EMBODIMENTS

Figure 1A:
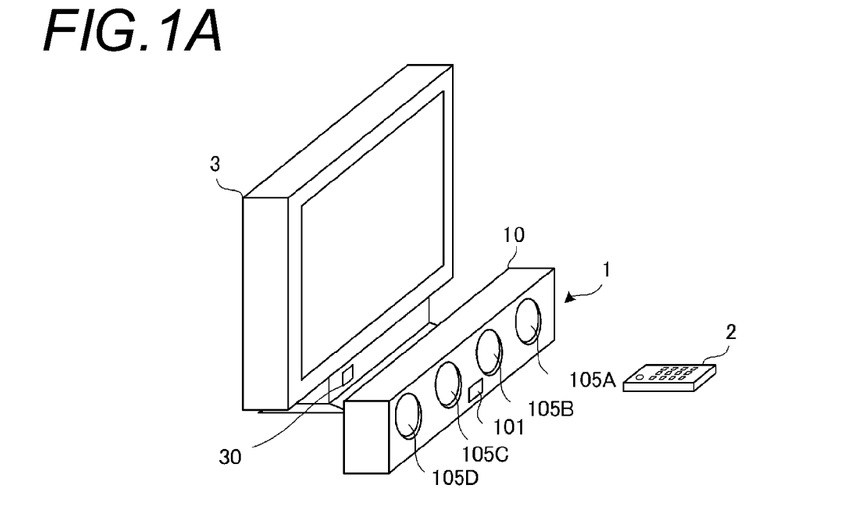
FIG. 1A is a diagram showing an installation environment of a bar speaker 1 according to an embodiment.

FIG. 1A is a diagram showing an installation environment of a bar speaker 1 according to an embodiment. As shown in FIG. 1A, the bar speaker 1 has a rectangular parallelepiped housing 10 which is long in a right-left direction and short in a height direction. The bar speaker 1 is installed in front of a television 3 and emits a sound signal output from the television 3. The bar speaker 1 performs an operation according to an infrared remote control signal emitted from a remote controller 2. For example, the bar speaker 1 regulates a sound emission level or changes a sound effect.

Figure 2:
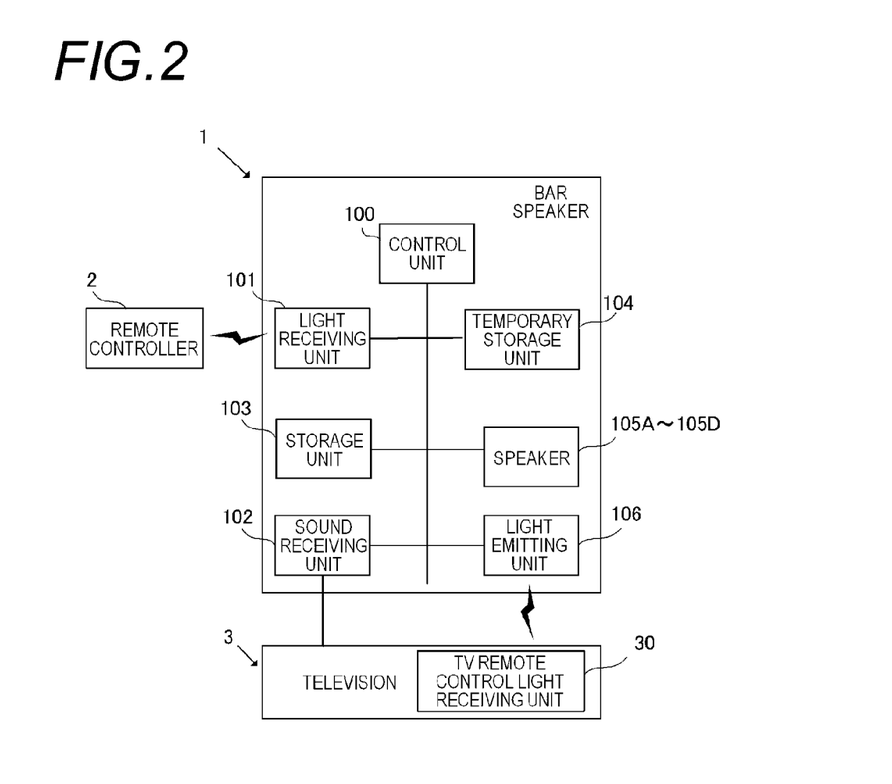
FIG. 2 is a block diagram of the bar speaker 1.

FIG. 2 is a block diagram of the bar speaker 1. The bar speaker 1 includes a control unit 100, a light receiving unit 101, a sound receiving unit 102, a storage unit 103, a temporary storage unit 104, a speaker 105A, a speaker 105B, a speaker 105C, a speaker 105D, and a light emitting unit 106.

Figure 4:
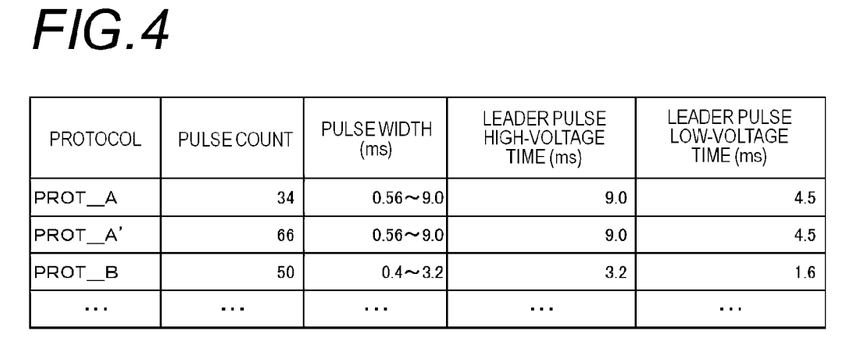
FIG. 4 shows an example of a protocol DB.

The control unit 100 is a functional unit which performs overall control of the bar speaker 1. The light receiving unit 101 receives the infrared remote control signal from the remote controller 2. The sound receiving unit 102 receives the sound signal output from the television 3. The control unit 100 allows the speakers 105A to 105D to emit the sound signal received by the sound receiving unit 102. The storage unit 103 stores an operation of the bar speaker 1 and an infrared remote control signal corresponding to the operation. The storage unit 103 stores a protocol DB of an infrared remote control signal. As shown in FIG. 4, the protocol DB of the infrared remote control signal correlates each protocol name with the definition of the pulse count, the pulse width, or the like. The protocol DB defines all kinds of protocols which are used for a remote control signal, but for ease of description, three kinds of PROT_A, PROT_A', and PROT_B are represented. The temporary storage unit 104 temporarily stores the infrared remote control signal received by the light receiving unit 101.

The bar speaker 1 operates in a normal mode or a learning mode. An operating mode of the bar speaker 1 is switched by user's operation (for example, with the reception of a specifying signal from the remote controller 2).

First, the operation of the bar speaker 1 in the normal mode is described. When the infrared remote control signal temporarily stored in the temporary storage unit 104 matches the infrared remote control signal stored in the storage unit 103, the control unit 100 performs control such that the respective functional units perform an operation corresponding to the infrared remote control signal. In this case, the control unit 100 does not cause the light emitting unit to transmit the received infrared remote control signal and does not relay the infrared remote control signal. Even if the remote controller 2 is not a dedicated remote controller of the bar speaker 1, the remote controller 2 can control the operation of the bar speaker 1 by a learning function of the bar speaker 1 described below.

When the received infrared remote control signal is not stored in the storage unit 103, the control unit 100 performs control such that the respective functional units implement a repeat function. Hereinafter, the repeat function is described.

Figure 1B:
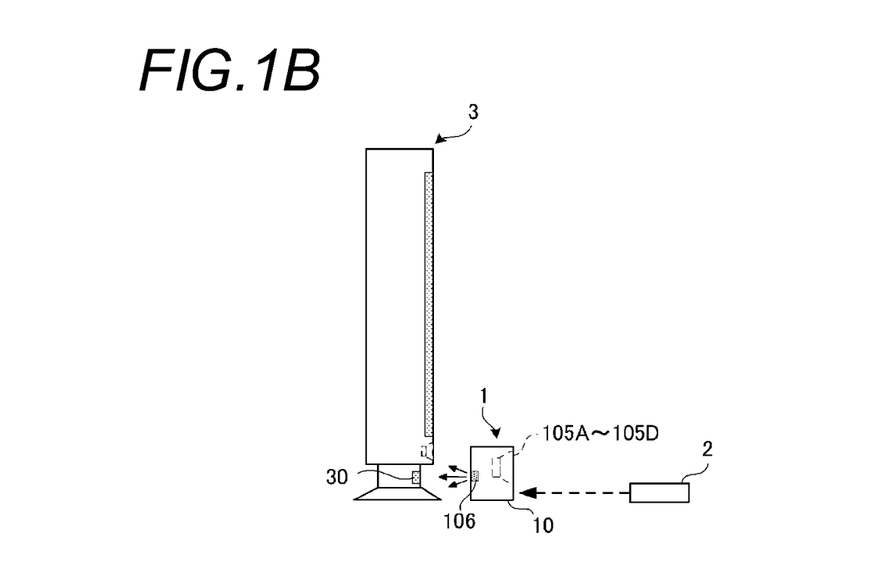
FIG. 1B is a diagram when the installation environment in FIG. 1A is viewed from the lateral side.

As shown in FIG. 1B, light from the remote controller 2 does not reach a TV remote control light receiving unit 30 since the remote control light receiving unit 30 of the television 3 is blocked by the bar speaker 1. On the other hand, light from the remote controller 2 reaches the light receiving unit 101 of the bar speaker 1. When the received infrared remote control signal is not stored in the storage unit 103, the control unit 100 allows the light emitting unit 106 provided on the rear surface (the side on which the television 3 is installed) of the bar speaker 1 to transmit the infrared remote control signal toward the television 3. In this way, the bar speaker 1 relays the infrared remote control signal to be transmitted to the television 3, and the infrared remote control signal reaches the television 3. The repeat function allows the user to control the television 3 using the remote controller 2 without any concerns for the presence of the bar speaker 1.

For example, a qualified volume adjustment signal for adjusting the volume of the bar speaker 1 is stored in the storage unit 103 when normally learned. Therefore, if the qualified volume adjustment signal is received, the bar speaker 1 adjusts the volume thereof without relaying the volume adjustment signal to the television 3. If the bar speaker 1 has erroneously learned a volume adjustment signal including noise, the qualified volume adjustment signal is not stored in the storage unit 103. Therefore, even if the qualified volume adjustment signal is received, the bar speaker 1 relays the volume adjustment signal to the television 3 without adjusting the volume thereof. As a result, the volume of television 3 may be adjusted. Accordingly, the bar speaker 1 learns a normal remote control signal while an abnormal remote control signal is prevented from being erroneously learned during learning.

Next, the operation of the bar speaker 1 in the learning mode is described. When the received infrared remote control signal is not stored in the storage unit 103, the control unit 100 stores the received infrared remote control signal in the storage unit 103 in correlation with an operation designated by the user. In this way, the bar speaker 1 includes a so-called remote control learning function. The above-described repeat function is controlled so as not to operate in the learning mode.

Hereinafter, an example of processing of the bar speaker 1 where the received infrared remote control signal is stored in the storage unit 103 in the learning mode is described referring to FIGS. 3 to 7.

Figure 3:
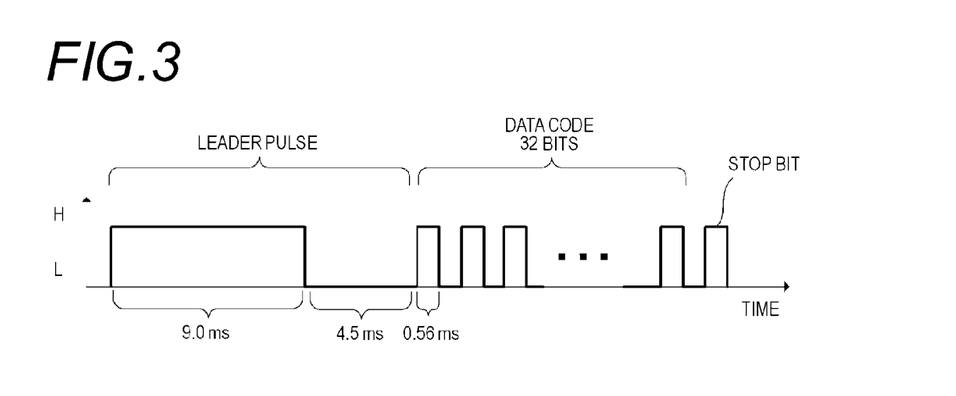
FIG. 3 is a schematic view of a qualified remote control signal.

First, the qualified infrared remote control signal is described referring to FIGS. 3 and 4. FIG. 3 is a schematic view of a remote control signal. The remote control signal has 34 pulses, and the width of each pulse is 0.56 ms to 9.0 ms. The remote control signal has a leader pulse representing the start of the signal, pulses expressing a data code, and a stop bit representing the end of the signal. As shown in FIG. 3, in the leader pulse, a light receiving state (H) continues for 9.0 ms, and next, a state (L) in which light is not received continues for 4.5 ms. In regards to the remote control signal shown in FIG. 3, the pulse count, the pulse width, the H time of the leader pulse, and the L time of the leader pulse match all conditions for the protocol "PROT_A" shown in FIG. 4. Accordingly, the remote control signal shown in FIG. 3 is a qualified infrared remote control signal conforming to PROT_A.

As described above, all kinds of protocols which are used as a remote control signal are defined in the protocol DB shown in FIG. 4. Accordingly, an infrared remote control signal conforming to any protocol defined in the protocol DB is a qualified infrared remote control signal.

Next, a signal which is not a qualified infrared remote control signal is described. Since the bar speaker 1 is installed inside a room, a fluorescent lamp or sunlight entering from a window is present around the bar speaker 1.

Figure 7:
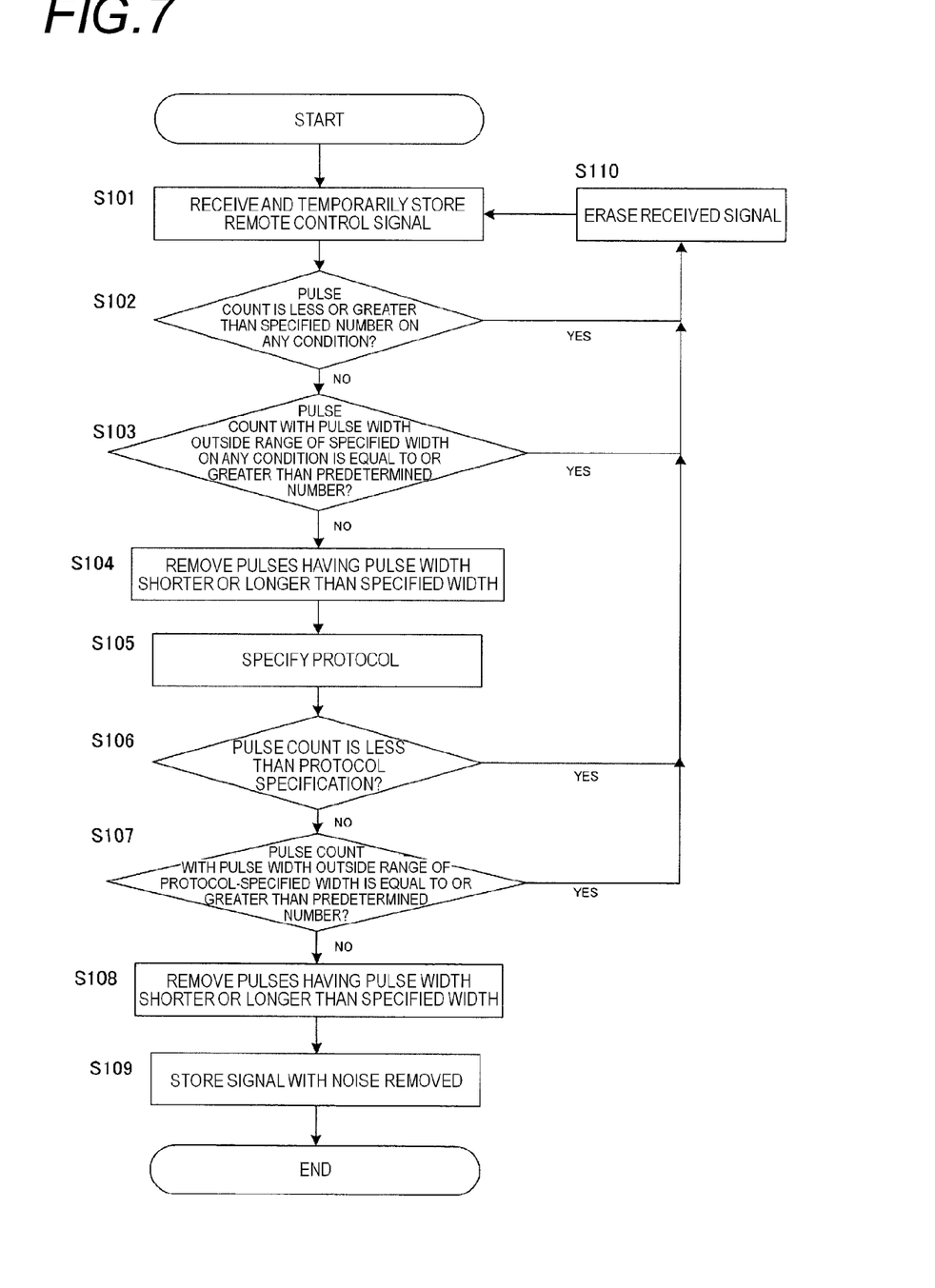
FIG. 7 is a flowchart of processing for extracting and storing a remote control signal.

Next, processing until the light receiving unit 101 receives an infrared remote control signal and the infrared remote control signal is stored in the storage unit 103 is described referring to a flowchart shown in FIG. 7.

The control unit 100 temporarily stores the infrared remote control signal received by the light receiving unit 101 in the temporary storage unit 104 (S101), and progresses to Step S102. The control unit 100 determines whether the pulse count included in the temporarily stored infrared remote control signal is less or greater than the pulse count defined by any protocol (S102). That is, the control unit 100 determines whether the pulse count detected from the temporarily stored infrared remote control signal is less than a minimum pulse count among the pulse counts defined in all protocols in the protocol DB or is greater than a maximum pulse count among the pulse counts defined in all protocols in the protocol DB. This determination is performed by the control unit 100 which refers to the protocol DB, obtains the minimum value and the maximum value of the pulse counts defined in all protocols, and compares these values with the detected pulse count.

When the detected pulse count is less than the minimum value of the defined pulse counts or greater than the maximum value of the defined pulse counts (S102: YES), the control unit 100 determines that the temporarily stored infrared remote control signal is a noise signal and progresses to Step S110. In Step S110, the control unit 100 erases the infrared remote control signal temporarily stored in the temporary storage unit 104. When the detected pulse count is equal to or greater than the minimum value of the pulse counts defined in all protocols and is equal to or less than the maximum value of the pulse counts defined in all protocols (S102: NO), the control unit 100 determines that the temporarily stored infrared remote control signal is not a noise signal and progresses to Step S103.

Figure 5A:
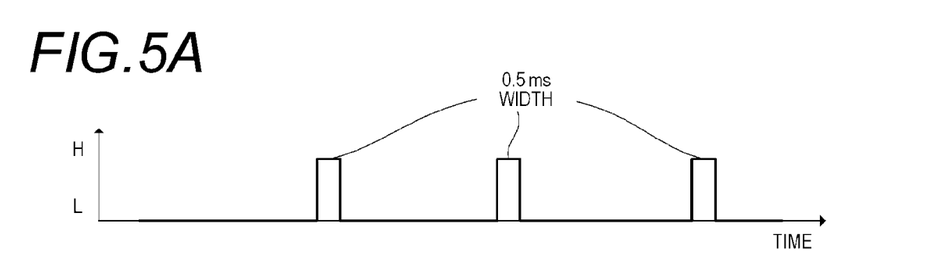
FIG. 5A is a schematic view of a noise signal.

An example of the processing of Step S102 is described referring to FIGS. 4 and 5A. FIG. 5A is a schematic view of a noise signal. In the example of the noise signal, as shown in FIG. 5A, a form in which a pulse having 0.5 ms width is intermittently generated appears. The control unit 100 detects three pulses in a remote control signal shown in FIG. 5A. In the example shown in FIG. 4, the pulse count of a qualified remote control signal is defined to be 34, 50, or 66. Accordingly, the minimum value of the pulse counts of the qualified remote control signal is 34, and the maximum value is 66. Since the detected pulse count is less than the minimum value of the pulse counts of the qualified remote control signal, the control unit 100 determines that the infrared remote control signal which is temporarily stored in the temporary storage unit 104 is a noise signal.

Returning to FIG. 7, Step S103 is described. The control unit 100 determines whether or not a pulse count with a pulse width outside a range of a pulse width defined in any protocol in the received infrared remote control signal is equal to or greater than a predetermined number (for example, 3) (S103). That is, the control unit 100 counts pulses with a pulse width shorter than a minimum value in the range of the pulse width defined in all protocols and pulses with a pulse width longer than a maximum value in the range of the pulse width defined in all protocols. The counting processing is performed by the control unit 100 which refers to the protocol DB, obtains the minimum value and the maximum value of the pulse widths defined in all protocols, and compares these values with the pulse width of the detected pulse.

When the counted pulse number is equal to or greater than a predetermined number (for example, 3) (S103: YES), the control unit 100 determines that the temporarily stored infrared remote control signal is a noise signal and progresses to Step S110. When the counted pulse count is less than the predetermined number (S103: NO), the control unit 100 determines that the temporarily stored infrared remote control signal is not a noise signal and progresses to Step S104.

Figure 5B:
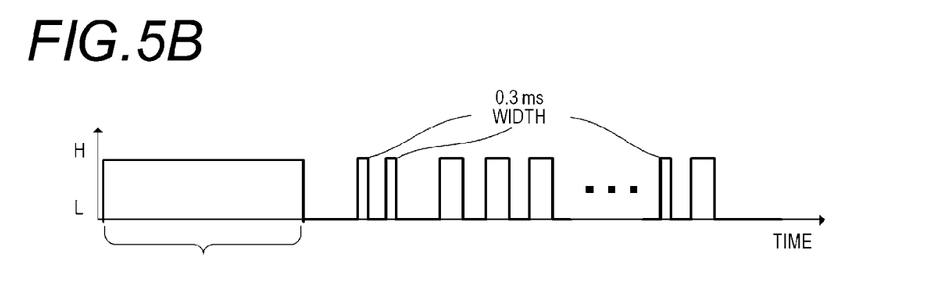
FIG. 5B is a schematic view of another noise signal.

An example of the processing of Step S103 is described referring to FIGS. 4 and 5B. FIG. 5B is a schematic view of a remote control signal including a noise component. As shown in FIG. 5B, the noise component appears as a pulse having a pulse width shorter than a leader pulse or the like. The control unit 100 detects three pulses having 0.3 ms width in a remote control signal shown in FIG. 5B. In the example shown in FIG. 4, the range of the pulse width of the qualified remote control signal is 0.4 ms, which is the minimum value of the pulse width defined in PROT_B, to 9.0 ms, which is the maximum value of the pulse width defined in PROT_A and PROT_A'. Since there are three or more pulses having 0.3 ms width outside the range of the pulse width of the qualified remote control signal in the example of the remote control signal shown in FIG. 5B, the control unit 100 determines that the infrared remote control signal temporarily stored in the temporary storage unit 104 is a noise signal.

As described above, in the bar speaker 1, it is possible to prevent erroneous storage of a signal which is apparently a noise signal having a pulse count less or greater than any qualified infrared remote control signals. In the bar speaker 1, it is possible to prevent erroneous storage of a noise signal which has pulses with a pulse width shorter or longer than the pulse width defined in any qualified infrared remote control signals. As a result, in the bar speaker 1, even if a protocol of an infrared remote control signal received in the learning mode is unspecified, it is possible to prevent erroneous storage of a signal which is apparently a noise signal.

Returning to FIG. 7, Step S104 is described. The control unit 100 performs signal processing for removing pulses having a pulse width shorter than the minimum value of the pulse width defined in any protocol or longer than the pulse width defined in any protocol from the infrared remote control signal temporarily stored in the temporary storage unit 104 (S104). The minimum value and the maximum value of the pulse width are obtained by the control unit 100 which refers to the protocol DB. The bar speaker 1 removes a noise component from the received infrared remote control signal, thereby extracting an infrared remote control signal matching a qualified protocol. For example, when there is only one pulse having 0.3 ms width in the L state of the leader pulse of the received infrared remote control signal, in Step S103, it is determined that the infrared remote control signal is not a noise signal. For this reason, the pulse having 0.3 ms width remains. However, such pulse is not defined in any protocols shown in FIG. 4 and becomes a noise component. Accordingly, the control unit 100 can remove the remaining noise component and can extract a qualified infrared remote control signal conforming to any protocol.

Next, the control unit 100 specifies a protocol to which an infrared remote control signal after denoising processing conforms (S105). Specifically, the control unit 100 specifies a protocol from the time of the H state and the time of the L state of the leader pulse. For example, when the H state of the leader pulse continues for 3.2 ms and then the L state of the leader pulse continues for 1.6 ms, the control unit 100 specifies PROT_B among the protocols shown in FIG. 4.

Next, the control unit 100 determines whether or not the detected pulse count is less than the pulse count defined in the specified protocol (S106). When the detected pulse count is less than the pulse count defined in the specified protocol (S106: YES), the control unit 100 progresses to Step S110. When the detected pulse count is equal to or greater than the pulse count defined in the specified protocol (S106: NO), the control unit 100 progresses to Step S107. This determination is performed by the control unit 100 which reads the pulse count defined in the specified protocol from the protocol DB and compares the read pulse count with the detected pulse count.

Figure 6A:
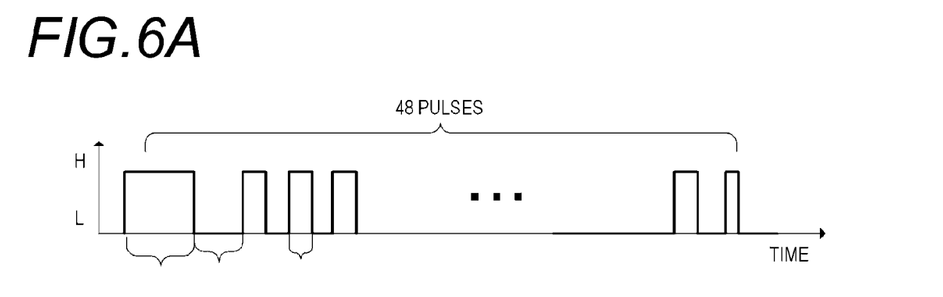
FIG. 6A is a schematic view of a remote control signal which does not satisfy a protocol.

An example of the processing of Step S106 is described referring to FIGS. 4 and 6A. The processing of Step S106 is performed by specifying a protocol in Step S105 and narrowing down an allowable range of the pulse count used in the processing of Step S102. FIG. 6A is a schematic view of a remote control signal when a part of an infrared remote control signal conforming to PROT_B shown in FIG. 4 is received. As shown in FIG. 6A, the remote control signal has 48 pulses. In Step S102, since the pulse count is within a range of 34 to 66, it is determined that the remote control signal is not a noise signal. However, as shown in FIG. 4, the pulse count of PROT_B is defined to be 50. Accordingly, the pulse count of the remote control signal shown in FIG. 6A is less than the pulse count defined in PROT_B (S106: YES). In this case, the control unit 100 progresses to Step S110 and erases the temporarily stored infrared remote control signal.

As described above, the bar speaker 1 specifies a protocol, thereby determining whether or not the received remote control signal is a qualified remote control signal on a condition narrowed down from the condition of Step S102. As a result, in the bar speaker 1, it is possible to recognize data missing with an insufficient number of necessary pulses and to prevent erroneous storage of missing data. In the bar speaker 1, it is possible to prevent erroneous storage of an infrared remote control signal including a signal of a different protocol.

Returning to FIG. 7, if the process progresses to Step S107, the control unit 100 determines whether or not a predetermined number (for example, 3) of pulses having a pulse width outside the range of the pulse width defined in the specified protocol are included. When a predetermined number of pulses having a pulse width outside the range of the defined pulse width are included (S107: YES), the control unit 100 determines that the infrared remote control signal is not available due to many noise components and progresses to Step S110. When the pulse count with the pulse width outside the range of the defined pulse width is less than the predetermined number (S107: NO), the control unit 100 progresses to Step S108. This determination is performed by the control unit 100 which reads the pulse width defined in the specified protocol from the protocol DB and compares the read pulse width with the pulse width of the detected pulse.

Figure 6B:
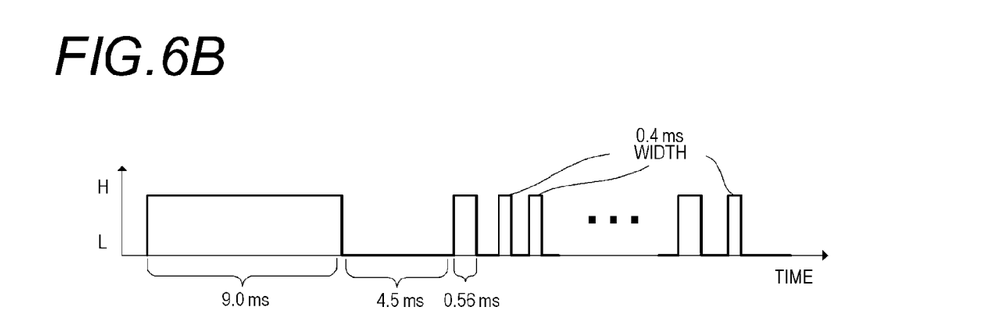
FIG. 6B is a schematic view of another remote control signal which does not satisfy a protocol.

An example of the processing of Step S107 is described referring to FIGS. 4 and 6B. The processing of Step S107 is performed by specifying a protocol in Step S105 and narrowing down an allowable range of the pulse width used in the processing of Step S103. FIG. 6B is a schematic view of a remote control signal when some pulses of an infrared remote control signal conforming to PROT_B are inserted into an infrared remote control signal conforming to PROT_A shown in FIG. 4. As shown in FIG. 6B, the remote control signal includes three pulses having 0.4 ms width. Since the pulse count with a pulse width not conforming to PROT_A is 3, the control unit 100 determines that the received infrared remote control signal is an unavailable signal (S107: YES), and progresses to Step S110.

Returning to FIG. 7, the control unit 100 performs signal processing for removing pulses having a pulse width outside the range of the pulse width defined in the specified protocol (S108). This signal processing is performed by specifying a protocol in Step S105, and as in the processing of Steps S106 and S107, narrowing down the condition used in the processing of Step S104.

For example, when there is only one pulse having 0.4 ms width in the L state of the leader pulse of the received infrared remote control signal, it is determined in the Step S103 that the infrared remote control signal is not a noise signal, and in Step S106, even if it is specified to be PROT_A, in Step S107, it is determined that the infrared remote control signal is not a noise signal. However, the pulse having 0.4 ms width is not defined in PROT_A and is thus not required. In this case, the control unit 100 can remove a pulse not conforming to the specified protocol and can extract an infrared remote control signal matching the specified protocol.

Finally, the control unit 100 stores the infrared remote control signal with an unnecessary pulse removed, which is temporarily stored in the temporary storage unit 104, in the storage unit 103 in correlation with operation designated by the user and ends the remote control learning function (S109).

A condition other than the conditions for the leader pulse may be used in order to specify the protocol in Step S105.

The processing of Steps S102, S103, S104, S106, S107, and S108 is not essential processing in the present invention. It is not necessary to particularly specify a protocol name in Step S105.

This application is based on Japanese Patent Application No. 2012-190486 filed Aug. 30, 2012, the contents of which are incorporated herein by reference.

REFERENCE SIGNS LIST

1: bar speaker
2: remote controller
3: television
100: control unit
101: light receiving unit
102: sound receiving unit
103: storage unit
104: temporary storage unit

The invention claimed is:

1. An electric device which has a remote control signal learning function of storing a first remote control signal as a qualified remote control signal in a storage part, the electric device comprising:
    a reception part which receives the first remote control signal and a second remote control signal different from the first remote control signal;
    a signal condition storage part which stores a plurality of conditions for the qualified remote control signal; and
    a control part which performs first processing or second processing when the second remote control signal is received by the reception part, wherein
    the first processing is processing for performing control such that the electric device performs a predetermined operation when the second remote control signal matches the qualified remote control signal stored previously in the storage part,
    the second processing is processing for, when the second remote control signal received by the reception part does not satisfy any one of the conditions for the qualified remote control signal stored in the signal condition storage part at a time of learning the second remote control signal, determining that the second remote control signal is not a qualified remote control signal and preventing the second remote control signal from being stored in the storage part, and
    the conditions for the qualified remote control signal includes one or more of: (i) a condition that the pulse count of a remote control signal is within a range of a predetermined number and (ii) a condition that a width of a pulse of a remote control signal is within a range of a predetermined length.

2. The electric device according to claim 1, wherein
    the control part specifies a protocol of the second remote control signal received by the reception part, and
    the control part determines that the received second remote control signal is not the qualified remote control signal when the received remote control signal satisfies a first condition among the conditions for the qualified remote control signal, but does not satisfy a second condition corresponding to the specified protocol.

3. The electric device according to claim 1, wherein
    the control part performs denoising processing for removing a noise component from the second remote control signal when it is determined that the noise component is included in the second remote control signal.

4. The electric device according to claim 1, wherein
    when it is determined that the second remote control signal is a qualified remote control signal, the control part stores the second remote control signal as a qualified remote control signal in the storage part.

5. A non-transitory computer-readable medium storing executable instructions, the executable instructions when executed by at least one controller causes an electric device, which has a remote control learning function of storing a first remote control signal as a qualified remote control signal in a storage part, to perform a method for determining a remote control signal, the method comprising the acts of:
    receiving the first remote control signal and a second remote control signal different from the first remote control signal;
    storing a plurality of conditions for the qualified remote control signal; and
    performing first processing or second processing when the second remote control signal is received in the reception step, wherein
    the first processing is processing for performing control such that the electric device performs a predetermined operation when the second remote control signal received in the reception step matches the qualified remote control signal stored previously in the storage part,
    the second processing is processing for, when the second remote control signal received in the reception step does not satisfy any one of the conditions for the qualified remote control signal stored in the signal condition storage step at a time of learning the second remote control signal, determining that the second remote control signal is not a qualified remote control signal and preventing the second remote control signal from being stored in the storage part, and
    the conditions for the qualified remote control signal includes one or more of: (i) a condition that the pulse count of a remote control signal is within a range of a predetermined number and (ii) a condition that a width of a pulse of a remote control signal is within a range of a predetermined length.

6. A remote control signal processing method in an electric device, the method comprising:
    at a time of leaning a remote control signal, when a received remote control signal does not satisfy any one of a plurality of conditions for a qualified remote control signal stored in a signal condition storage part, determining that the remote control signal is not a qualified remote control signal, and the received remote control signal is not stored in a storage part, but when the received remote control signal satisfies one of the stored conditions, storing the remote control signal as a qualified remote control signal in the storage part; and performing control such that the electric device performs a predetermined operation when the received remote control signal matches the qualified remote control signal stored in the storage part, and wherein the conditions for the qualified remote control signal includes one or more of: (i) a condition that the pulse count of a remote control signal is within a range of a predetermined number and (ii) a condition that a width of a pulse of a remote control signal is within a range of a predetermined length.

* * * * *